(No Model.) 2 Sheets—Sheet 1.

J. WALKER.
GEAR CUTTING MACHINE.

No. 496,676. Patented May 2, 1893.

Witnesses.
Frank Miller.
M. S. Ingham.

Inventor.
John Walker
By E. L. Thurston
his atty (No Model.) 2 Sheets—Sheet 2.

J. WALKER.
GEAR CUTTING MACHINE.

No. 496,676. Patented May 2, 1893.

Witnesses.
Frank. Miller.
M. S. Ingham.

Inventor.
John Walker
By E. L. Thurston
his atty.

UNITED STATES PATENT OFFICE.

JOHN WALKER, OF CLEVELAND, OHIO.

GEAR-CUTTING MACHINE.

SPECIFICATION forming part of Letters Patent No. 496,676, dated May 2, 1893.

Application filed May 31, 1892. Serial No. 434,879. (No model.)

*To all whom it may concern:*

Be it known that I, JOHN WALKER, a citizen of the United States, residing at Cleveland, in the county of Cuyahoga and State of Ohio, have invented certain new and useful Improvements in Gear-Cutting Machines; and I do hereby declare the following to be a full, clear, and exact description of the invention, such as will enable others skilled in the art to which it appertains to make and use the same.

The object of my invention is to provide a gear cutting machine adapted simultaneously to cut two inter-dental spaces in gears having an odd number of teeth.

To this end it consists in the construction and combination of parts hereinafter described and pointed out definitely in the claims.

Figure 1:
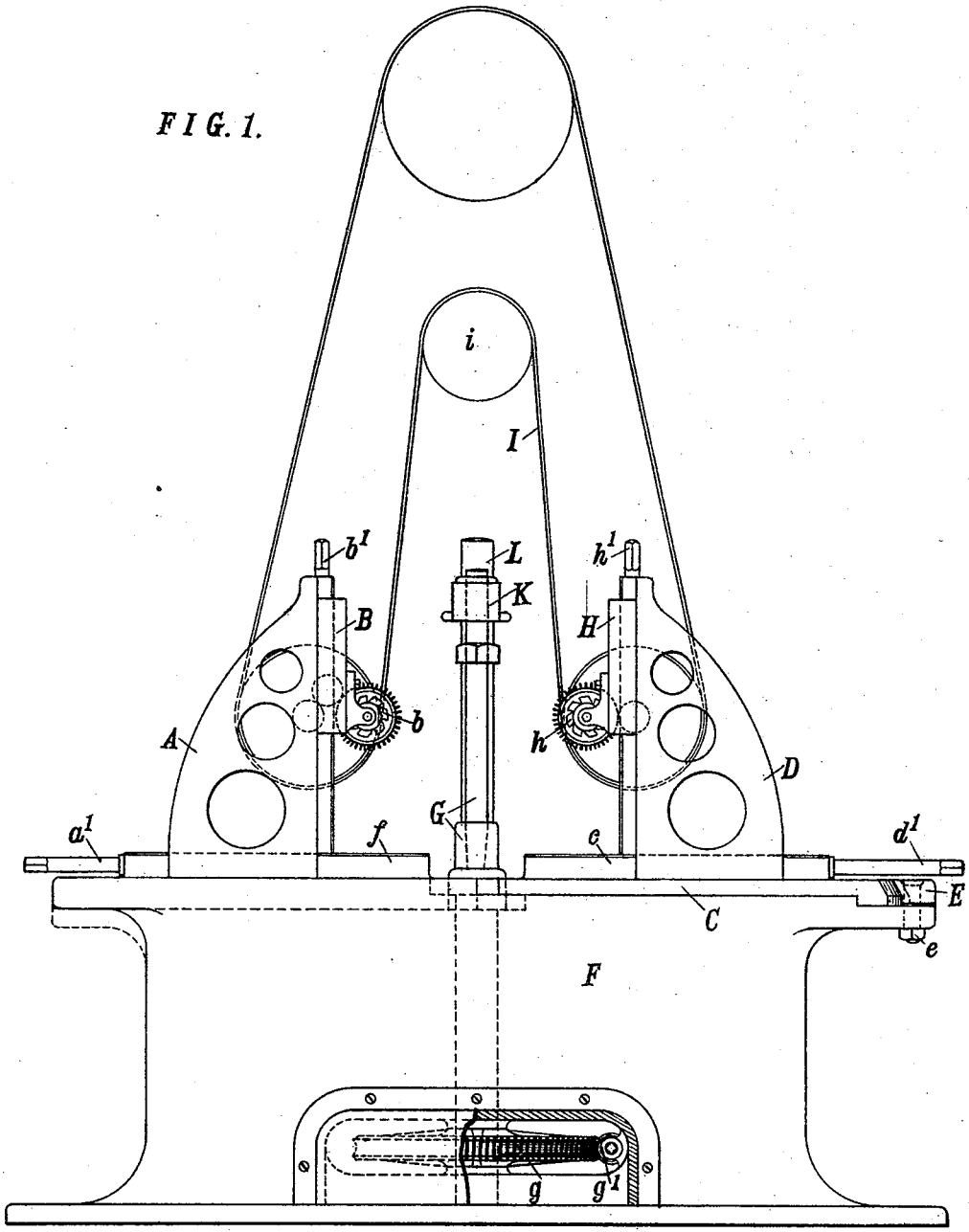
Figure 2:
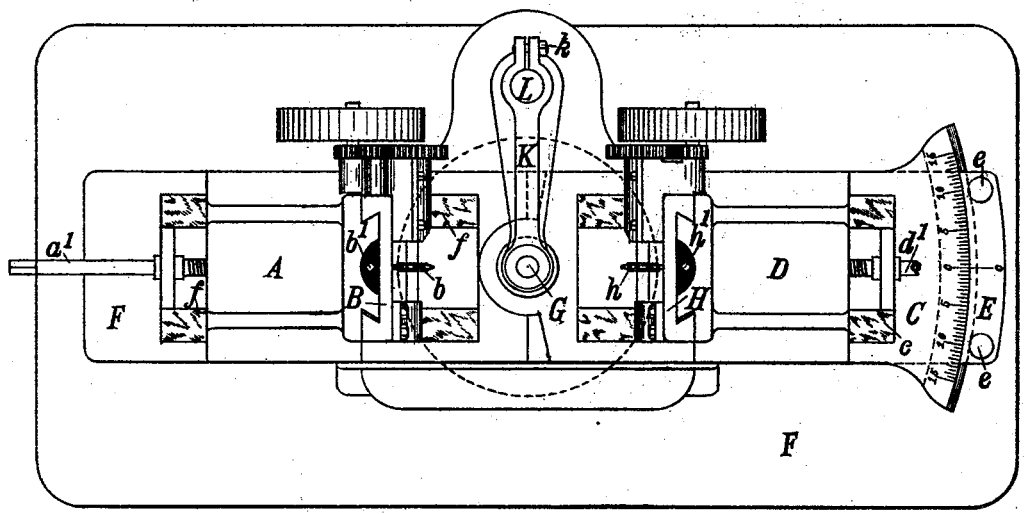
Figure 3:
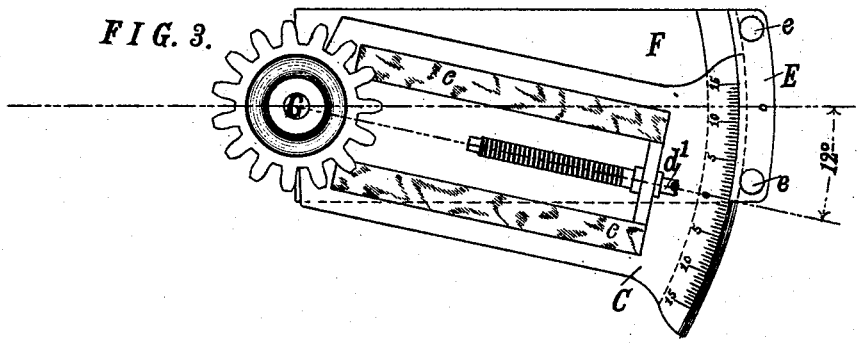

In the drawings, Figure 1 is a side elevation of a gear cutting machine containing my invention. Fig. 2 is a plan view of the same; and Fig. 3 is a detail view of the pivoted plate which supports one carriage and cutter and operating mechanism.

Referring to the parts by letters, F represents the horizontal bed plate of the machine; G represents the vertical work spindle which is supported in suitable bearings in the frame of the machine. This spindle is rotated by means of the worm wheel $g$ and worm $g'$ in the usual manner. A movable carriage A is mounted in suitable horizontal guides $f$ on the bed F; and a vertically movable cutter carrier B is mounted on guides on the face of said carriage. The carriage A may be moved by the screw $a'$, and the cutter carrier may be fed by the screw $b'$; or any other suitable mechanism may be employed for imparting these motions. A plate C rests upon the bed plate F, and is pivoted on the spindle G. As shown, this plate may be moved upon its pivot through about fifteen degrees in either direction, and this I believe sufficient for practical purposes. This plate is provided with horizontal guides $c$ on which a carriage D, similar to the carriage A is adapted to operate. A cutter carrier H is movable in vertical guides on the carriage D; and the carriage may be adjusted and the cutter carrier fed by the screws $d'$ and $h'$ respectively, or by any suitable mechanism, as with the carriage A and cutter carrier B. The outer end of the plate C is in the form of the arc of a circle having the spindle G for its center—and the curved end of this plate is graduated in degrees, as shown.

E represents a plate which serves the double purpose of a clamp to hold the plate C in a fixed position, and as a graduated plate which coacts with the graduations on plate C in securing the proper positioning of said plate. The outer edge of the plate C is beveled downward and outward, and the similarly curved edge of the plate E is oppositely beveled, and the plate E is so placed that its beveled edge engages with the beveled edge of the plate C. The plate E is vertically movable when the bolts $e\ e$ are loosened, to an extent sufficient to permit the plate C to be moved as desired; and when the bolts $e\ e$ are screwed up the plate C is firmly held.

The cutter $b$ which, together with its operating mechanism, is mounted on the cutter carrier B, and the cutter $h$ which with its operating mechanism is mounted on the cutter carrier H are both driven by the same belt I which may be arranged as shown and held tight by a belt tightener at $i$.

The work spindle G is steadied at its upper end by an arm K having a bearing for said spindle in one end. The other end is vertically movable on a vertical post L which is fastened to the bed F, and this arm is fixed in position on said post by clamping bolts $k$ or any other suitable means.

When desired to cut a gear having an odd number of teeth, it is fastened to the spindle G, and the plate C is moved to one side or the other a sufficient number of degrees (which may easily be ascertained in each case) to bring its cutter opposite the interdental space next to the tooth which is to lie diametrically opposite to the space the cutter $b$ is to cut, and then fastened by the clamping device described. Upon starting the machine, two interdental spaces will be simultaneously cut by the cutters $b$ and $h$.

Having thus described my invention, what I claim as new, and desire to secure by Letters Patent, is—

1. In a gear cutting machine, a work spindle G, a plate C pivoted to said spindle, and having a curved and graduated end, combined with a carriage mounted on said plate and movable toward and from the spindle, and a movable cutter carrier mounted on said carriage, with a fixed graduated plate and means for holding the plate C in fixed position, substantially as set forth.

2. In a gear cutting machine, the combination of a vertical work spindle G, the carriage A, cutter carrier B and cutter b, with the plate C pivoted on the spindle G having a curved beveled and graduated end, the carriage D, cutter carrier H, cutter h, and a beveled graduated plate E, the bolts e e, substantially as set forth.

In testimony whereof I affix my signature in presence of two witnesses.

JOHN WALKER.

Witnesses:
   E. L. THURSTON,
   M. S. INGHAM.